(12) United States Patent
Kang et al.

(10) Patent No.: US 10,570,987 B2
(45) Date of Patent: Feb. 25, 2020

(54) DAMPER PULLEY FOR CRANKSHAFT AND METHOD FOR MANUFACTURING THE SAME

(71) Applicants: Hyundai Motor Company, Seoul (KR); Kia Motors Corporation, Seoul (KR)

(72) Inventors: Mun Gu Kang, Gyeonggi-Do (KR); Hee Sam Kang, Seoul (KR); Hyo Moon Joo, Seoul (KR); Young Chan Kim, Gyeonggi-Do (KR); Min Soo Kim, Seoul (KR); Jae Kwon Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 59 days.

(21) Appl. No.: 15/959,710

(22) Filed: Apr. 23, 2018

(65) Prior Publication Data
US 2019/0178331 A1  Jun. 13, 2019

(30) Foreign Application Priority Data

Dec. 12, 2017  (KR) .......................... 10-2017-0170477

(51) Int. Cl.
| F16F 15/126 | (2006.01) |
| F16H 55/36 | (2006.01) |
| F16J 15/32 | (2016.01) |
| F16J 15/3232 | (2016.01) |
| F16F 15/12 | (2006.01) |

(52) U.S. Cl.
CPC ........ F16F 15/126 (2013.01); F16F 15/1207 (2013.01); F16H 55/36 (2013.01); F16J 15/3232 (2013.01); F16F 2230/30 (2013.01); F16H 2055/366 (2013.01)

(58) Field of Classification Search
CPC .. F16F 15/126; F16F 15/1207; F16F 15/1208; F16F 15/12; F16F 15/14; F16H 55/36; F16J 15/3232
See application file for complete search history.

(56) References Cited

U.S. PATENT DOCUMENTS

| 6,675,759 | B2 | 1/2004 | Johnson et al. |
| 2014/0306570 | A1* | 10/2014 | Marino ................. B22D 13/04 310/211 |
| 2015/0072818 | A1* | 3/2015 | Lee ......................... F16F 15/14 474/166 |

FOREIGN PATENT DOCUMENTS

| JP | H 09-220655 A | 8/1997 |
| JP | 2011-252567 A | 12/2011 |
| KR | 10-1053188 | 2/2010 |
| KR | 10-1490948 B1 | 2/2015 |

* cited by examiner

*Primary Examiner* — Jacob M Amick
(74) *Attorney, Agent, or Firm* — Mintz Levin Cohn Ferris Glovsky and Popeo, P.C.; Peter F. Corless (57) ABSTRACT

A damper pulley for a crankshaft includes a hub mounted on one end of the crankshaft, a rim connected to the hub, an oil seal mounted on an outer surface of the hub, and a wear-resistant insert member integrally mounted on the hub and making contact with the oil seal.

11 Claims, 10 Drawing Sheets

DAMPER PULLEY FOR CRANKSHAFT AND METHOD FOR MANUFACTURING THE SAME

CROSS-REFERENCE TO RELATED APPLICATION

This application claims under 35 U.S.C. § 119(a) the benefit of Korean Patent Application No. 10-2017-0170477, filed on Dec. 12, 2017 in the Korean Intellectual Property Office, the entire contents of which are incorporated by reference herein.

BACKGROUND (a) Technical Field

The present disclosure relates to a damper pulley for a crankshaft, more specifically, to a damper pulley for a crankshaft that is capable of preventing oil leakage and to a method for manufacturing the same.

(b) Description of the Related Art

As is well known in the art, internal combustion engines are used to drive automobiles and other vehicles. Typically, a reciprocating operation of cylinders in an internal combustion engine generates power that is transmitted to wheels of the vehicle through a crankshaft. The engine has a cylinder head including the cylinders, where a sequential explosion of gases in the cylinders drives the crankshaft.

The crankshaft translates reciprocating motion of pistons into rotational motion in a power stroke to transmit the output of the engine to the outside and transmits motion to the pistons in an intake stroke, a compression stroke, and an exhaust stroke.

The rotation and torque of the crankshaft causes unwanted vibrations. A damper pulley is mounted on one end (accessory drive) of the crankshaft to counter torsional and resonant vibrations from the crankshaft.

The damper pulley has a hub mounted on the one end of the crankshaft and a rim connected to the hub. An oil seal is mounted on an outer surface of the hub of the damper pulley. Accordingly, the oil seal is interposed between the cylinder block and the damper pulley to prevent oil leakage between the cylinder block and the damper pulley.

A damper pulley in the related art typically is made of cast iron with high wear resistance. However, the damper pulley has a disadvantage in that the weight of the damper pulley is excessive. To solve this problem, a damper pulley may be made of a light metal, i.e., a metal with a low density, such as aluminum, magnesium, or the like. The damper pulley made of the light metal has an advantage of being relatively light in weight.

However, since the damper pulley is made of the light metal, a hub of the damper pulley may be easily worn down due to contact with an oil seal, and thus oil may leak between the hub and the oil seal.

In recent years, a method of forming a coating layer on an outer surface of a hub by thermal spraying has been proposed, and such a coating layer may contribute to improving wear resistance of the hub.

However, the method using thermal spraying has shortcomings in that additional cost is incurred due to the addition of thermal spraying and post-processing of a coated surface by thermal spraying, and a problem of stabilizing the quality of the coated surface additionally may result.

Further, the coating layer formed by thermal spraying may have a high porosity, and therefore oil may severely leak between the hub and an oil seal.

SUMMARY

An aspect of the present disclosure provides a damper pulley for a crankshaft that is capable of effectively preventing oil leakage between a hub of the damper pulley and an oil seal, and provides a method for manufacturing the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a damper pulley for a crankshaft includes a hub mounted on one end of the crankshaft, a rim connected to the hub, an oil seal mounted on an outer surface of the hub, and a wear-resistant insert member integrally mounted on the hub and making contact with the oil seal.

The hub may have an oil pocket formed on the outer surface of the hub, and the oil pocket may receive oil therein.

The oil seal may be mounted to cover the oil pocket.

The oil seal may have first and second seal lips that make contact with the outer surface of the hub, and the oil pocket may be located between the first seal lip and the second seal lip.

The oil pocket may have a width smaller than a distance between the first seal lip and the second seal lip.

The oil pocket may be formed on an outer surface of the wear-resistant insert member.

The wear-resistant insert member may be integrally mounted on the hub by centrifugal casting.

The hub and the rim of the damper pulley may be made of a light metal, and the wear-resistant insert member may be made of a wear-resistant material.

A first damping member may be disposed on an outer surface of the rim, and an outer member may be disposed on an outer surface of the first damping member.

A second damping member may be disposed on an inner surface of the rim, and an inertia member may be disposed on an inner surface of the second damping member.

According to another aspect of the present disclosure, a method for manufacturing a damper pulley for a crankshaft includes combining upper and lower molds having cavities that correspond to a hub and a rim of the damper pulley, attaching a wear-resistant insert member to an inlet of the upper mold, and integrally mounting the wear-resistant insert member on a circumference of the hub by injecting molten metal into the inlet of the upper mold and curing the injected molten metal for a predetermined period of time while rotating the upper mold and the lower mold.

The method may further include forming an oil pocket on an outer surface of the wear-resistant insert member after integrally mounting the wear-resistant insert member on the hub of the damper pulley.

The method may further include attaching the wear-resistant insert member to the inlet of the upper mold after forming the oil pocket on the outer surface of the wear-resistant insert member.

According to the present disclosure, by forming one or more oil pockets on an outer surface of a hub of a damper pulley to receive oil therein, it is possible to prevent oil from a cylinder block from leaking between an oil seal and the hub.

Especially, by integrally mounting a wear-resistant insert member, such as steel, on the hub and forming an oil pocket on an outer surface of the insert member, it is possible to effectively prevent oil leakage between the oil seal and the hub.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

Terms such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
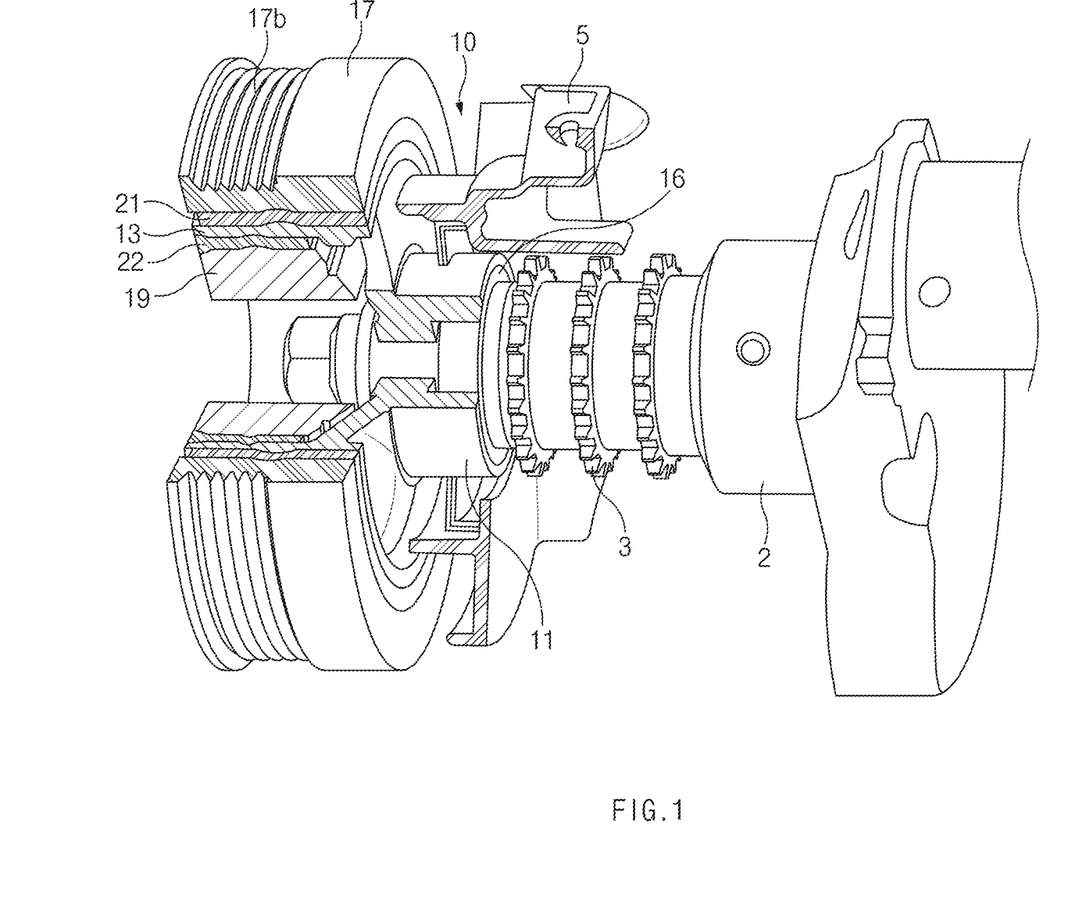
FIG. 1 is a partial cutaway perspective view of a damper pulley for a crankshaft according to an embodiment of the present disclosure.

Referring to FIG. 1, a damper pulley 10 according to an embodiment of the present disclosure may be connected to one end of a crankshaft 2. The crankshaft 2 may be mounted in a cylinder block (not illustrated) so as to be rotatable, and a cover 5 may be mounted on a side of the cylinder block (not illustrated) so as to be removable.

The crankshaft 2 may have sprockets 3 formed on an outer surface thereof, and a timing belt or a timing chain may be wound around the sprockets 3 and may be covered with the cover 5.

The damper pulley 10 may include a hub 11 mounted on the one end of the crankshaft 2 and a rim 13 connected to the hub 11.

The hub 11 may have a cavity 12 in which to receive the one end of the crankshaft 2 and may be coupled to the one end of the crankshaft 2 through a fastener.

The hub 11 may have, on an inner surface thereof, an annular groove 14 in which a friction spring 16 is mounted. The one end of the crankshaft 2 may be inserted into the friction ring 16 such that the friction ring 16 is interposed between the outer surface of the crankshaft 2 and the inner surface of the hub 11 in a radial direction. The crankshaft 2 and the hub 11 may be firmly coupled together through the friction ring 16.

The rim 13 may have an annular shape and may be connected to an outer surface of the hub 11 through a web 15. The rim 13 may have a larger diameter than the hub 11.

The rim 13 may have a protrusion 13a that protrudes outwardly from a middle portion of the rim 13. The protrusion 13a may contribute to improving the stiffness of the rim 13.

A first damping member 21 may be attached to an outer surface of the rim 13 and may have an annular shape to correspond to the outer surface of the rim 13. The first damping member 21 may have a curved section 21a corresponding to the protrusion 13a of the rim 13, and the protrusion 13a of the rim 13 may be engaged with the curved section 21a of the first damping member 21. The first damping member 21 may be made of an elastic material, such as rubber.

An outer member 17 may be disposed on an outer surface of the first damping member 21, and an inner surface of the outer member 17 may make contact with the first damping member 21. The outer member 17 may have an engagement groove 17a corresponding to the curved section 21a of the first damping member 21, and the curved section 21a of the first damping member 21 may be engaged with the engagement groove 17a of the outer member 17.

The outer member 17 may have, on an outer surface thereof, one or more grooves 17b with which protrusions of an accessory belt (not illustrated) are meshed, and the accessory belt (not illustrated) may be wound around the outer member 17.

The first damping member 21 may be interposed between the rim 13 and the outer member 17, and thus the damper pulley 10 may ensure damping performance.

A second damping member 22 may be attached to an inner surface of the rim 13 and may have an annular shape to correspond to the inner surface of the rim 13. The second damping member 22 may be made of an elastic material, such as rubber.

The rim 13 may have an engagement groove 13b formed on the inner surface thereof, and the second damping member 22 may have a curved section 22b. The curved section 22b of the second damping member 22 may be engaged with the engagement groove 13b of the rim 13.

An inertia member 19 may be disposed on an inner surface of the second damping member 22 and may be configured to modify a natural frequency generated between the crankshaft 2 and the damper pulley 10 or to dampen vibrations therebetween.

The inertia member 19 may have a protrusion 19b that is engaged with the curved section 22b of the second damping member 22.

The second damping member 22 may be interposed between the rim 13 and the inertia member 19, and thus the damper pulley 10 may ensure damping performance.

Figure 2:
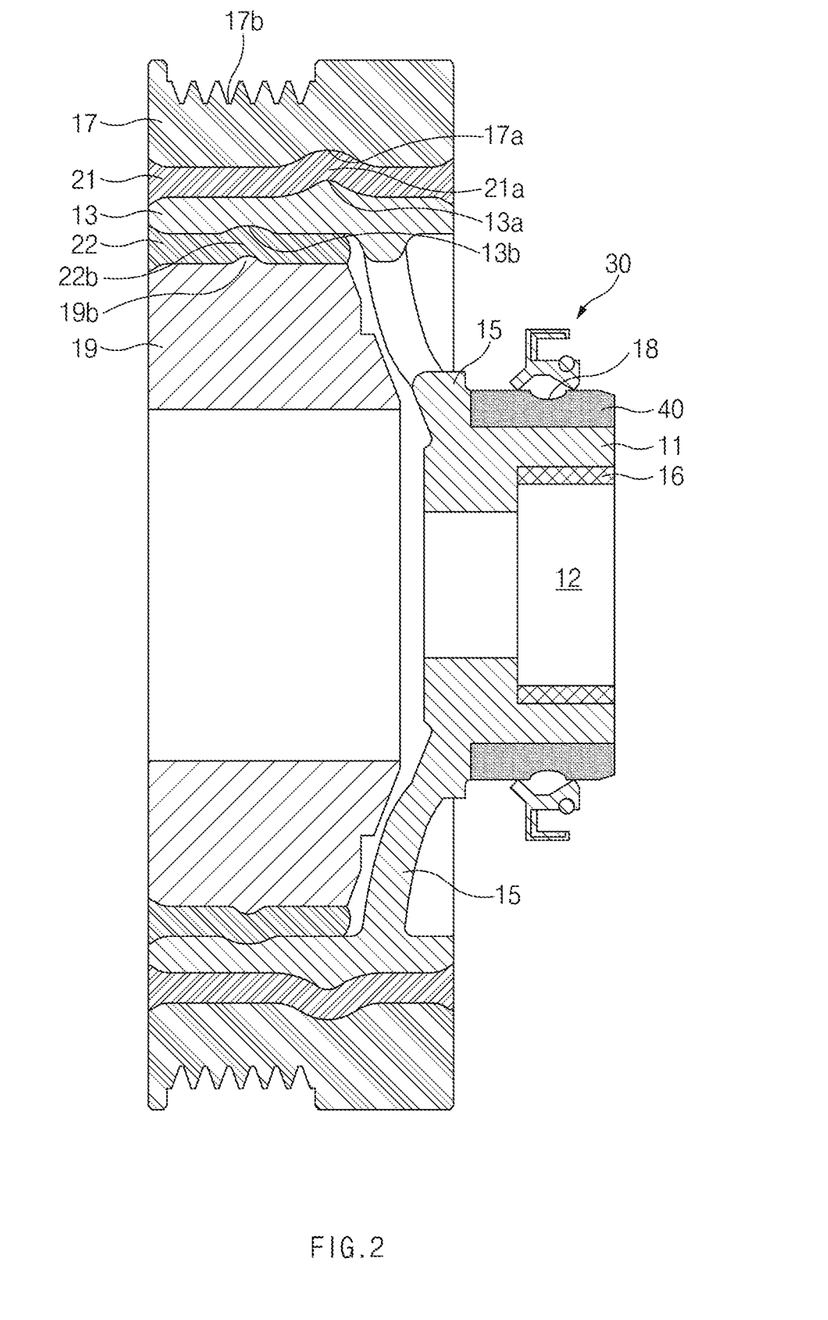
FIG. 2 is a sectional view of the damper pulley for the crankshaft according to the embodiment depicted in FIG. 1.
Figure 3:
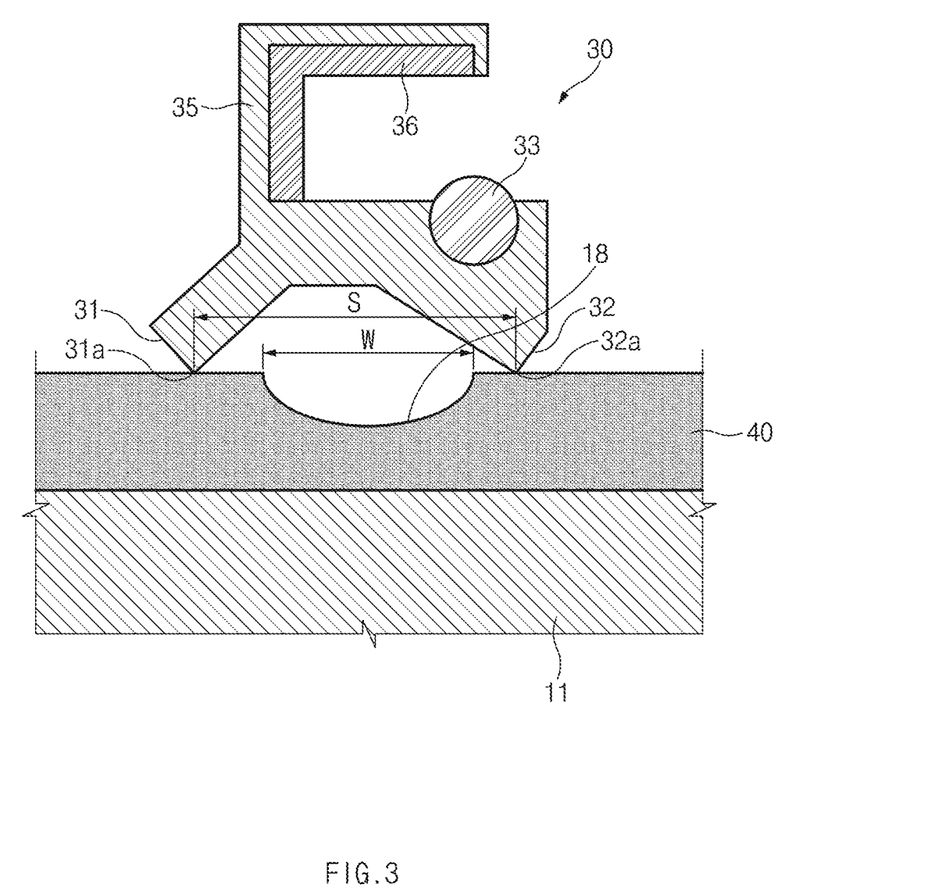
FIG. 3 is an enlarged sectional view of an oil seal and an oil pocket illustrated in FIG. 2.

As illustrated in FIGS. 2 and 3, an annular oil seal 30 may be mounted on the outer surface of the hub 11. The oil seal 30 may include a seal body 35 and first and second seal lips 31 and 32 connected to the seal body 35.

The seal body 35 may have an L-shaped section, and a reinforcing member 36 may be attached to the seal body 35.

An annular garter spring 33 may be attached to a portion adjacent to the second seal lip 32 and may exert an elastic force on the oil seal 30 in a circumferential direction.

The first seal lip 31 may have a contact end 31a that makes contact with the outer surface of the hub 11, and the contact end 31a may be formed to be sharp.

The second seal lip 32 may have a contact end 32a that makes contact with the outer surface of the hub 11, and the contact end 32a may be formed to be sharp.

The first seal lip 31 and the second seal lip 32 may be spaced apart from each other, and an end of the first seal lip 31 and an end of the second seal lip 32 may make contact with the outer surface of the hub 11.

As illustrated in FIGS. 2 and 3, the hub 11 may have an oil pocket 18 in which oil is received, and the oil pocket 18 may be formed on the outer surface of the hub 11. Since oil of the cylinder block (not illustrated) is received in the oil pocket 18 as described above, oil leakage between the outer surface of the hub 11 and the oil seal 30 may be assuredly prevented.

The oil seal 30 may be mounted to cover the oil pocket 18, and thus the oil pocket 18 may be located between the first seal lip 31 and the second seal lip 32 of the oil seal 30. The oil pocket 18 may have a width w that is smaller than the distance s between the first seal lip 31 and the second seal lip 32.

Since the first and second seal lips 31 and 32 of the oil seal 30 make contact with the outer surface of the hub 11, oil is likely to leak between the hub 11 and the oil seal 30 when the outer surface of the hub 11 is worn down.

To solve the above-described problem, as illustrated in FIGS. 2 to 9, a wear-resistant insert member 40 may be integrally mounted on the circumference of the hub 11 to form an outer surface of the hub 11. The wear-resistant insert member 40 may be integrated with the hub 11 through insert molding or centrifugal casting and may be located on the hub 11 to make contact with the oil seal 30.

The wear-resistant insert member 40 may be made of a material with high wear resistance, such as steel. The wear-resistant insert member 40 may not be easily worn down even though the wear-resistant insert member 40 makes contact with the first and second seal lips 31 and 32 of the oil seal 30.

Especially, since the oil pocket 18 is formed on an outer surface of the insert member 40, oil leakage between the oil seal 30 and the hub 11 may be effectively prevented.

According to an embodiment, the hub 11 and the rim 13 of the damper pulley 10 may be made of a light metal, which is a metal of low density, such as aluminum, magnesium, or the like.

According to an embodiment, the hub 11 and the rim 13 of the damper pulley 10 may be made of a wrought aluminum alloy, such as Al 1XXX series alloy (Al1085, Al1080, Al1070, A1050, A1100, A1200, A1N00), Al 2XXX series alloy (A2014, A2017, A2219, A2024), Al 3XXX series alloy (A3003, A3203), Al 5XXX series alloy (A5005, A5052, A5652, A5154, A5182), Al 6XXX series alloy (A6061), or the like.

According to another embodiment, the hub 11 and the rim 13 of the damper pulley 10 may be made of a cast aluminum alloy, such as A 3XX series alloy (A356, A357, AC2B, AC4B, A365), ADC (ADC 1~12), or the like.

According to an embodiment, the wear-resistant insert member 40 may be made of a material with high wear resistance, such as steel.

According to an embodiment, the wear-resistant insert member 40 may be made of general machine structural carbon steel (STKM 11 ~STKM 18) or stainless steel (SUS 304, 316, 416, 440).

As described above, the damper pulley 10 according to the present disclosure may be made of heterogeneous materials and may thus satisfy both lightweight and wear resistance.

Table 1 below shows oil leakage evaluation test results of the present disclosure and examples of the related art.

|  | Example 1 of Related Art (Cast Iron) | Example 2 of Related Art (Anodizing) | Example 3 of Related Art (Thermal Spraying) | Present Disclosure |
|---|---|---|---|---|
| Material | FC250 | A7075 + H.A | A7075 + Mo | A7075 + S20C |
| Wear Rate | 0 μm/600 Hr | 260 μm/600 Hr | 0 μm/900 Hr (Micro Cracks) | 0 μm/600 Hr |
| Leakage Result | None | Leakage | Cracks | None |

In example 1 of the related art, the damper pulley was made of FC250 (cast iron). There was no wear due to the oil seal, and therefore there was no oil leakage between the hub of the damper pulley and the oil seal.

In example 2 of the related art, the damper pulley was made of A7075 (aluminum), and the hub of the damper pulley was surface-treated by hard anodizing (HA). The wear rate of the hub was 260 μm/600 Hr, and there was a high level of oil leakage.

In example 3 of the related art, the damper pulley was made of A7075 (aluminum), and the hub of the damper pulley was surface-treated by thermally spraying molybdenum (Mo) particles onto the hub. There was no wear of the hub, but the hub had micro cracks on the surface thereof.

In the present disclosure, the damper pulley was made of A7075 (aluminum), and the wear-resistant insert member 40 made of S20C (steel) was mounted on the hub. There was no wear of the hub, and therefore there was no oil leakage between the hub of the damper pulley and the oil seal.

FIGS. 3 to 8 illustrate oil pockets according to various embodiments of the present disclosure.

FIG. 3 illustrates the oil pocket 18 according to a first embodiment. The oil pocket 18 according to the first embodiment may have a semicircular section.

Figure 4:
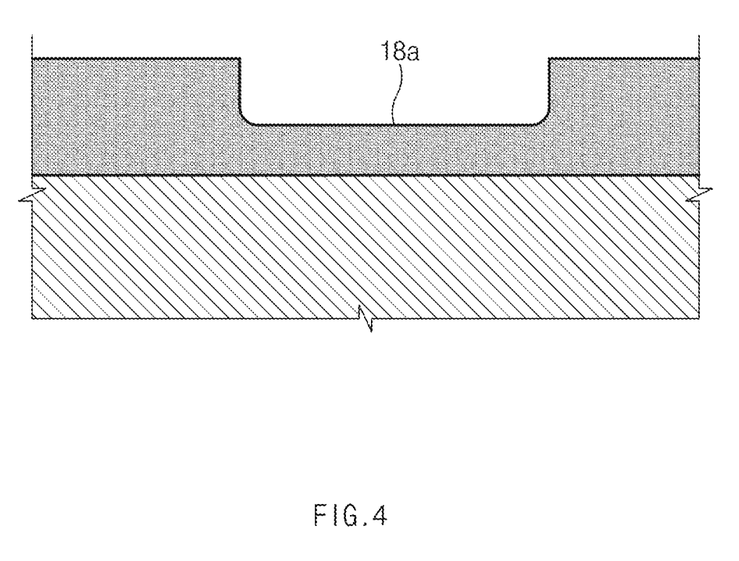
FIG. 4 is a sectional view of a second embodiment of an oil pocket according to the present disclosure.

FIG. 4 illustrates an oil pocket 18a according to a second embodiment. The oil pocket 18a according to the second embodiment may have a rectangular section.

Figure 5:
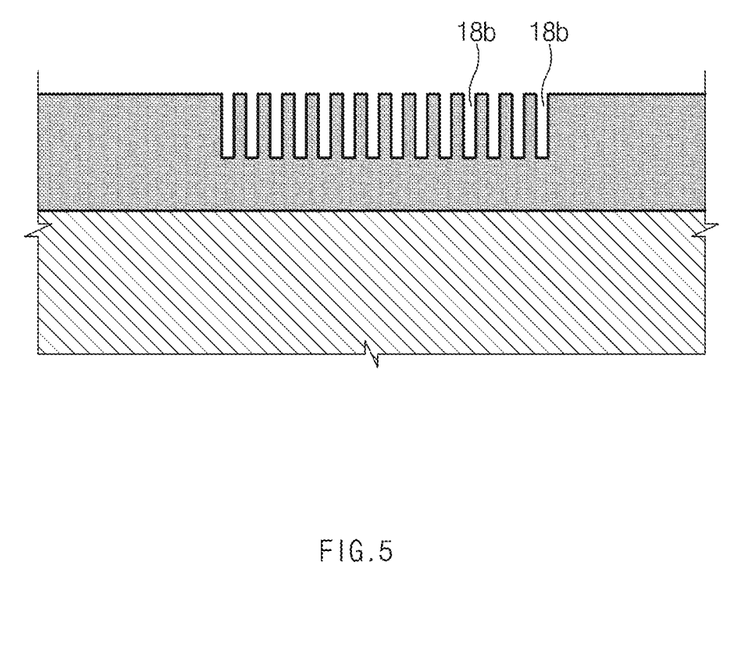
FIG. 5 is a sectional view of a third embodiment of an oil pocket according to the present disclosure.

FIG. 5 illustrates oil pockets 18b according to a third embodiment. According to the third embodiment, the plurality of oil pockets 18b may be spaced apart from one another by a predetermined distance and may extend in the vertical direction.

Figure 6:
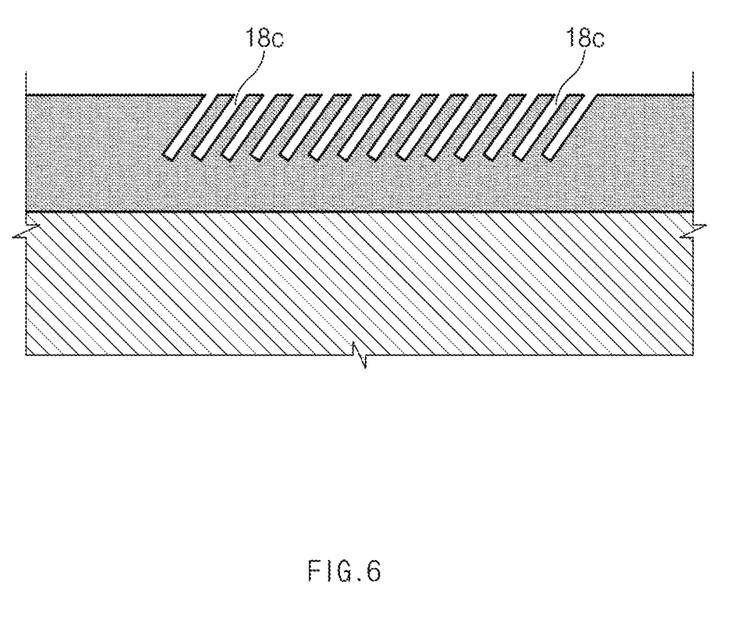
FIG. 6 is a sectional view of a fourth embodiment of an oil pocket according to the present disclosure.

FIG. 6 illustrates oil pockets 18c according to a fourth embodiment. According to the fourth embodiment, the plurality of oil pockets 18c may be spaced apart from one another by a predetermined distance and may extend in an inclined direction.

Figure 7:
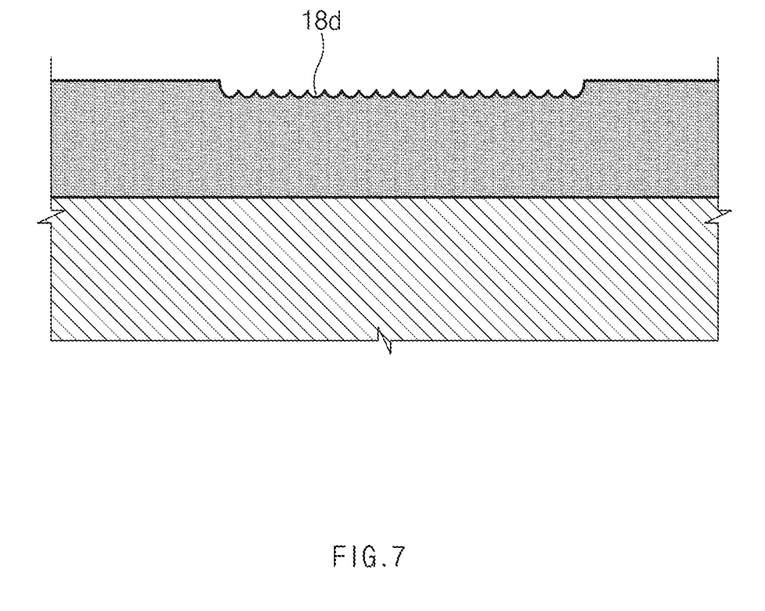
FIG. 7 is a sectional view of a fifth embodiment of an oil pocket according to the present disclosure.

FIG. 7 illustrates oil pockets 18d according to a fifth embodiment. According to the fifth embodiment, the plurality of oil pockets 18d may be formed in a series and may have a U-shaped section.

Figure 8:
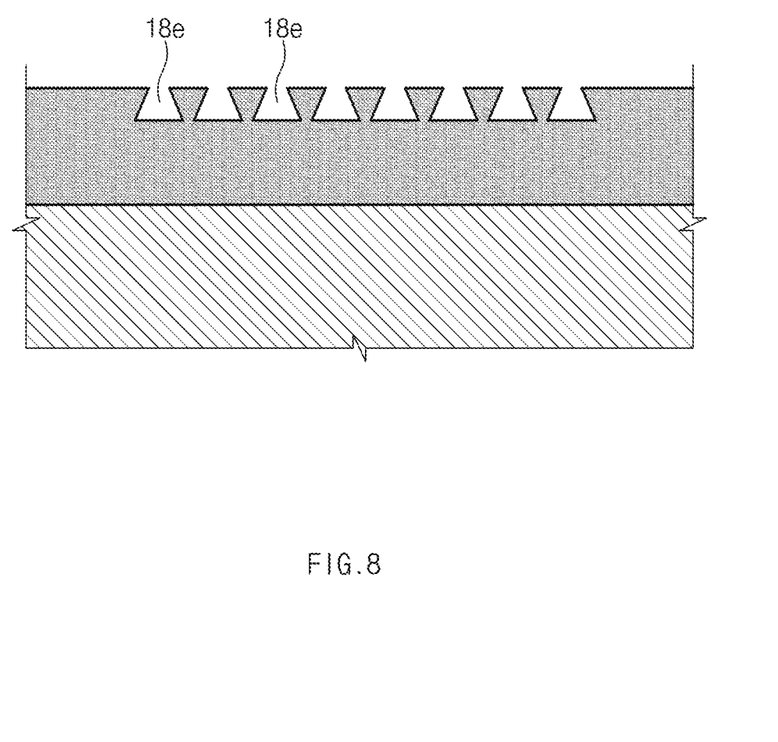
FIG. 8 is a sectional view of a sixth embodiment of an oil pocket according to the present disclosure.

FIG. 8 illustrates oil pockets 18e according to a sixth embodiment. According to the sixth embodiment, the plurality of oil pockets 18e may be spaced apart from one another by a predetermined distance and may have an inverted-triangular shape.

Figure 9:
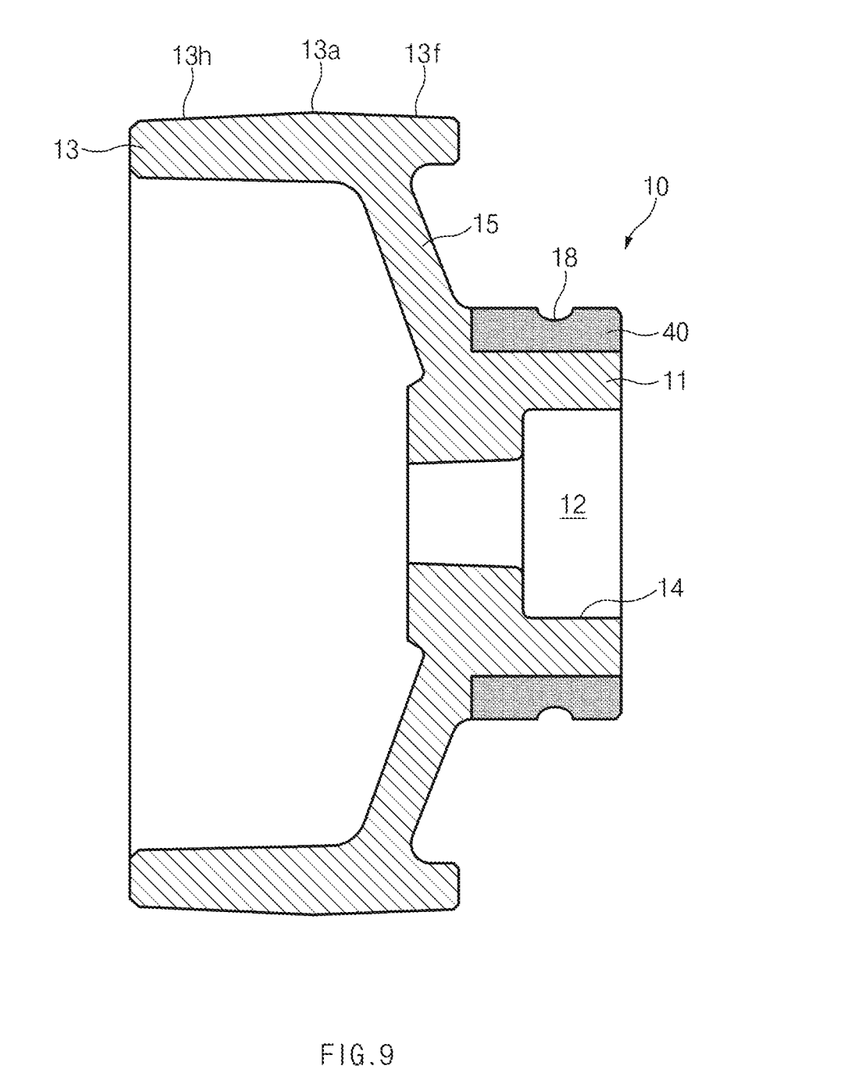
FIG. 9 is a sectional view of a sectional view of a damper pulley according to another embodiment of the present disclosure.

FIG. 9 illustrates the damper pulley 10 according to another embodiment of the present disclosure. As illustrated in FIG. 9, the damper pulley 10 may have two tapered surfaces 13f and 13h formed to be symmetric to each other with respect to a protrusion 13a. The tapered surfaces 13f and 13h may allow the first damping member 21 and the outer member 17 to be stably mounted on the rim 13.

According to an embodiment of the present disclosure, the wear-resistant insert member 40 may be mounted on and integrated with the hub 11 of the damper pulley 10 by centrifugal casting.

Figure 10:
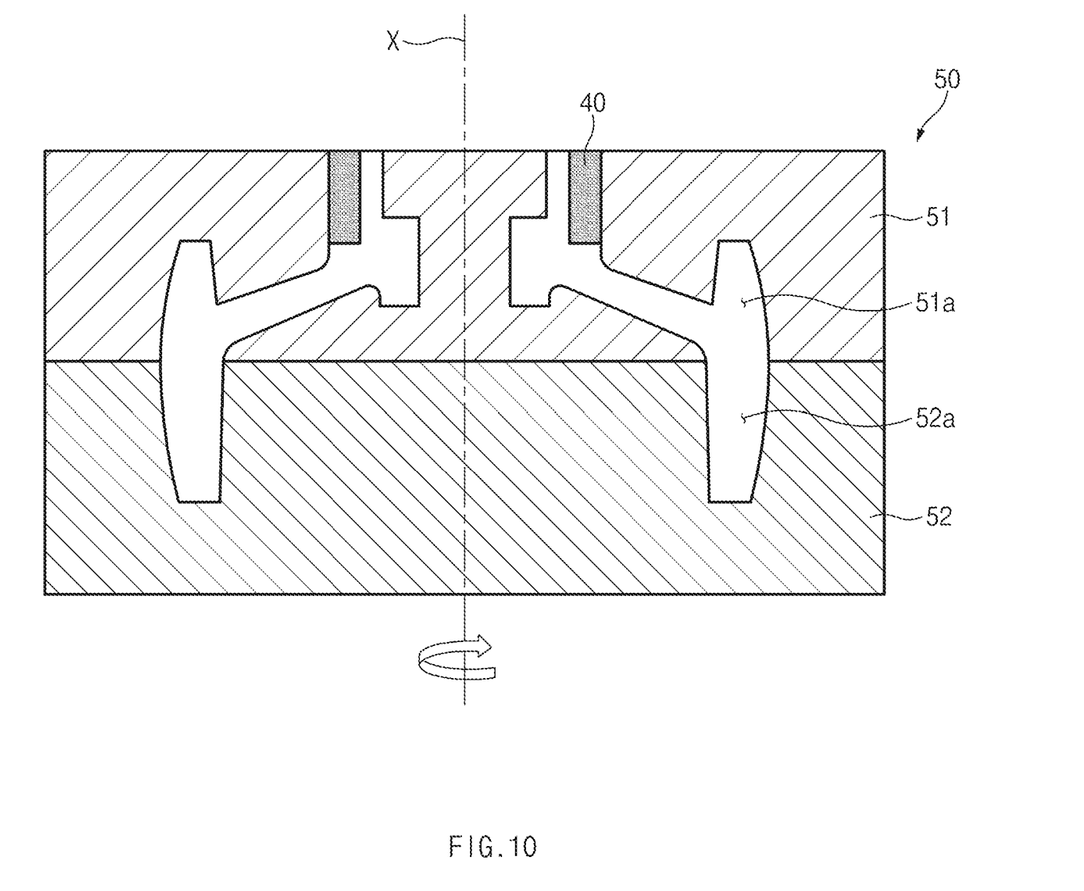
FIG. 10 is a sectional view of a centrifugal casting machine for manufacturing a damper pulley according to the present disclosure.

As illustrated in FIG. 10, a centrifugal casting machine 50 may include an upper mold 51 having an upper cavity 51a and a lower mold 52 having a lower cavity 52a.

The upper cavity 51a of the upper mold 51 and the lower cavity 52a of the lower mold 52 may be formed in a structure that corresponds to the hub 11 and the rim 13 of the damper pulley 10.

The upper mold 51 may have an inlet into which molten metal is injected, and may be configured such that the hub 11 of the damper pulley 10 is formed at the inlet of the upper mold 51. Accordingly, the wear-resistant insert member 40 may be simply and accurately attached to the upper mold 51.

When the upper mold 51 and the lower mold 52 are combined together, the wear-resistant insert member 40 may be attached to the inlet of the upper cavity 51a of the upper mold 51. Thereafter, the molten light metal may be injected into the inlet of the upper mold 51 and then cured for a predetermined period of time while the upper mold 51 and the lower mold 52 are being rotated about a central axis line X. As a result, the damper pulley 10 in which the wear-resistant insert member 40 is integrally mounted on the circumference of the hub 11 may be manufactured.

According to an embodiment, the oil pocket 18, 18a, 18b, 18c, 18d, or 18e may be formed on the outer surface of the wear-resistant insert member 40 after the wear-resistant insert member 40 is integrally mounted on the hub 11 of the damper pulley 10.

According to another embodiment, the wear-resistant insert member 40 may be attached to the upper cavity 51a of the upper mold 51 after the oil pocket 18, 18a, 18b, 18c, 18d, or 18e is formed on the outer surface of the wear-resistant insert member 40. Thereafter, molten light-metal may be injected into the inlet of the upper mold 51 while the upper mold 51 and the lower mold 52 are being rotated about the central axis line X. As a result, the wear-resistant insert member 40 may be integrally mounted on the hub 11 of the damper pulley 10.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure.

Therefore, exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A damper pulley for a crankshaft, the damper pulley comprising:
   a hub mounted on one end of the crankshaft;
   a rim connected to the hub;
   an oil seal mounted on an outer surface of the hub;
   a wear-resistant insert member integrally mounted on a circumference of the hub and configured to make contact with the oil seal; and an oil pocket recessed into the outer surface of the wear-resistant insert member and configured to receive oil.

2. The damper pulley of claim 1, wherein the oil seal is mounted to cover the oil pocket.

3. The damper pulley of claim 2, wherein the oil seal has a first seal lip and a second seal lip that make contact with the outer surface of the hub, and wherein the oil pocket is located between the first seal lip and the second seal lip.

4. The damper pulley of claim 3, wherein the oil pocket has a width smaller than a distance between the first seal lip and the second seal lip.

5. The damper pulley of claim 1, wherein the wear-resistant insert member is integrally mounted on the hub by centrifugal casting.

6. The damper pulley of claim 1, wherein the hub and the rim of the damper pulley are made of a light metal, and the wear-resistant insert member is made of a wear-resistant material.

7. The damper pulley of claim 1, wherein a first damping member is disposed on an outer surface of the rim, and an outer member is disposed on an outer surface of the first damping member.

8. The damper pulley of claim 1, wherein a second damping member is disposed on an inner surface of the rim, and an inertia member is disposed on an inner surface of the second damping member.

9. A method for manufacturing a damper pulley for a crankshaft, the method comprising:

combining upper and lower molds having cavities that correspond to a hub and a rim of the damper pulley;

attaching a wear-resistant insert member to an inlet of the upper mold; and integrally mounting the wear-resistant insert member on a circumference of the hub by injecting molten metal into the inlet of the upper mold and curing the injected molten metal for a predetermined period of time while rotating the upper mold and the lower mold.

10. The method of claim 9, further comprising:

forming an oil pocket on an outer surface of the wear-resistant insert member after integrally mounting the wear-resistant insert member on the hub of the damper pulley.

11. The method of claim 9, further comprising:

attaching the wear-resistant insert member to the inlet of the upper mold after forming the oil pocket on the outer surface of the wear-resistant insert member.

* * * * *